(12) United States Patent
Huang et al.

(10) Patent No.: US 11,525,572 B2
(45) Date of Patent: Dec. 13, 2022

(54) STEAM GENERATOR AND CAR WASHER WITH STEAM GENERATOR

(71) Applicants: Zhuhai Gree Intelligent Equipment Co., Ltd, Zhuhai (CN); Gree Electric Appliances, Inc. of Zhuhai, Zhuhai (CN)

(72) Inventors: Jiafeng Huang, Zhuhai (CN); Lihai Xu, Zhuhai (CN)

(73) Assignees: Zhuhai Gree Intelligent Equipment Co., Ltd, Zhuhai (CN); Gree Electric Appliances, Inc. of Zhuhai, Zhuhai (CN)

( * ) Notice: Subject to any disclaimer, the term of this patent is extended or adjusted under 35 U.S.C. 154(b) by 215 days.

(21) Appl. No.: 16/651,166

(22) PCT Filed: Aug. 3, 2018

(86) PCT No.: PCT/CN2018/098616
§ 371 (c)(1),
(2) Date: Mar. 26, 2020

(87) PCT Pub. No.: WO2019/128236
PCT Pub. Date: Jul. 4, 2019

(65) Prior Publication Data
US 2021/0364162 A1 Nov. 25, 2021

(30) Foreign Application Priority Data
Dec. 28, 2017 (CN) .......................... 201711499052.8

(51) Int. Cl.
*F23C 7/00* (2006.01)
*B60S 3/04* (2006.01)

(52) U.S. Cl.
CPC ................... *F23C 7/00* (2013.01); *B60S 3/04* (2013.01)

(58) Field of Classification Search
CPC ....... G06Q 30/06–08; F23C 7/00; B30S 3/04; B08B 7/04; B08B 15/00; B08B 3/02
(Continued)

(56) References Cited

U.S. PATENT DOCUMENTS

| 5,758,605 A | * | 6/1998 | Calkins | ................... F23L 7/002 122/31.1 |
| 2009/0133728 A1 | * | 5/2009 | Kim Brillouet | .......... B08B 3/00 134/57 R |
| 2014/0034302 A1 | * | 2/2014 | McGuffin | .................. F22B 1/18 166/251.1 |

FOREIGN PATENT DOCUMENTS

| CN | 2854357 | * | 1/2007 |
| CN | 2854357 Y | | 1/2007 |

(Continued)

OTHER PUBLICATIONS

"Dry Steam Cleaner cuts water use" (Product News Network, 2015, downloaded from https://dialog.proquest.com /professional/docview/ 1660993914?accountid=13144) (2015).*

(Continued)

*Primary Examiner* — Ethan D Civan
(74) *Attorney, Agent, or Firm* — Armstrong Teasdale LLP

(57) ABSTRACT

Some embodiments of the disclosure provide a steam generator and a car washer with the steam generator. The steam generator includes: a boiler having a combustion chamber. The steam generator further includes: a windproof cover, at least a part of an ignition device of the steam generator being located in the windproof cover; an igniting cover, at least a part of the igniting cover being located in the combustion chamber, and an outlet of the windproof cover being located in the igniting cover; an air inlet grating, the air inlet grating being provided around the windproof cover and connected with the windproof cover, and the air inlet grating being located on an inner side of an air inlet of the igniting cover, (Continued)

to prevent airflow in the igniting cover from flowing out from the inlet of the igniting cover.

19 Claims, 4 Drawing Sheets

(58) Field of Classification Search
USPC .................................................. 705/26.1–272
See application file for complete search history.

(56) References Cited

FOREIGN PATENT DOCUMENTS

| | | | | |
|---|---|---|---|---|
| CN | 202052700 | * | 7/2013 | |
| CN | 203052700 U | | 7/2013 | |
| CN | 205908406 U | | 1/2017 | |
| CN | 207815277 U | | 9/2018 | |
| DE | 2813808 A | * | 10/1979 | ............ F22B 1/1823 |
| WO | 2017060818 A1 | | 4/2017 | |

OTHER PUBLICATIONS

International Search Report for corresponding PCT/CN2018/098616, dated Oct. 15, 2018, 3 pages.

* cited by examiner

STEAM GENERATOR AND CAR WASHER WITH STEAM GENERATOR

CROSS-REFERENCE TO RELATED APPLICATIONS

The present disclosure is a national stage application of International Patent Application No. PCT/CN2018/098616, filed on Aug. 3, 2018, which claims priority to Chinese Patent Application No. 201711499052.8, filed on Dec. 28, 2017, and entitled "Steam Generator and Car Washer with Steam Generator," the contents of which are hereby incorporated by reference in their entirety.

TECHNICAL FIELD

The disclosure relates to a field of vehicle maintenance, in particular to a steam generator and a car washer with the steam generator.

BACKGROUND

Inventors knows that, a car washer is a machine using a computer to control a brush and high-pressure water to clean cars. The car washer is mainly composed of a control system, a circuit, an air channel, a water channel and a mechanical structure. The car washer has the characteristics of simple operation, elegant appearance, and small damage to car paint. In recent years, the car washer has been widely used in an automobile service industry.

With the improvement of international energy conservation and environmental protection mechanism and awareness, a way known to the inventors of using high-pressure water to wash car causes massive wastewater pollution and has other disadvantages; steam car washing just solves those problems, and steam car washing will become a new trend of development.

The main concept of steam car washing is that: first of all, the steam thoroughly cleans all parts of the car; and most importantly, steam car washing is not just a process of using high-pressure cold water to wash, but through the drying property of the steam, every small part of the car is thoroughly cleaned, sterilized, disinfected and deodorized at right pressure and temperature, so that a better car washing cleanliness is achieved. To improve simple cleaning to fine cleaning is closely related to the car owner's health.

However, airflow backflow easily occurs in the car washer known to inventors, that is, the airflow entering an igniting cover of the car washer easily flow out from an inlet of the igniting cover, which affects the normal ignition of the car washer.

SUMMARY

Some embodiments of the present disclosure provide a steam generator and a car washer with the steam generator, to solve the problem of airflow backflow which easily occurs in a car washer known to inventors.

Some embodiments of the present disclosure provide a steam generator, which includes: a boiler having a combustion chamber. The steam generator further includes: a windproof cover, at least a part of an ignition device of the steam generator being located in the windproof cover; an igniting cover, at least a part of the igniting cover being located in the combustion chamber and an outlet of the windproof cover being located in the igniting cover; and an air inlet grating, the air inlet grating being provided around the windproof cover and connected with the windproof cover, and the air inlet grating being located on the inner side of an air inlet of the igniting cover, to prevent airflow in the igniting cover from flowing out from an inlet of the igniting cover.

In an exemplary embodiment, an airflow through hole is provided on the air inlet grating, so that the airflow entering from an inlet of the windproof cover flows towards a middle part of the igniting cover after passing through the airflow through hole.

In an exemplary embodiment, an extension direction of the airflow through hole is inclined to an axial direction of the boiler.

In an exemplary embodiment, the steam generator further includes a plurality of airflow through holes, and the plurality of airflow through holes are provided around the windproof cover.

In an exemplary embodiment, the airflow through hole is a quadrangular hole.

In an exemplary embodiment, the air inlet grating is an annular plate. The air inlet grating is connected to an outlet end of the windproof cover and is provided around the outlet of the windproof cover.

In an exemplary embodiment, the steam generator further includes an air inlet baffle provided at the air inlet of the igniting cover. The air inlet baffle is connected with a side wall of the igniting cover and extends in a radial direction of the air inlet of the igniting cover. The air inlet grating is located at a lower side of the air inlet baffle.

In an exemplary embodiment, an annular gap is formed between an outside edge of the air inlet grating and an inner wall of the igniting cover.

In an exemplary embodiment, the steam generator further includes: an air duct retainer ring. An air inlet end of the air duct retainer ring is provided around an air outlet of the igniting cover and is connected with the igniting cover. An air outlet end of the air duct retainer ring is connected with an inner wall of the combustion chamber, so that the airflow in the igniting cover enters the combustion chamber after passing through the air duct retainer ring.

In an exemplary embodiment, the steam generator further includes: a mounting cover. The mounting cover is located outside of the igniting cover and the air duct retainer ring. The top of the mounting cover is connected with the igniting cover, and the bottom of the mounting cover is connected with the air duct retainer ring, so as to support the igniting cover in the combustion chamber.

Some embodiments of the present disclosure provide a car washer, which includes the abovementioned steam generator.

The steam generator in some embodiments of the disclosure includes the boiler, the windproof cover, the igniting cover and the air inlet grating. Because at least a part of the ignition device of the steam generator is located in the windproof cover, and at least a part of the igniting cover is located in the combustion chamber, the outlet of the windproof cover is located in the igniting cover, the air inlet grating is provided around the windproof cover and is connected with the windproof cover, and the air inlet grating is located at the inner side of the air inlet of the igniting cover. In this way, air in the igniting cover is blocked by using the air inlet grating, so as to prevent the air in the igniting cover from flowing out from the air inlet of the igniting cover, and then prevent the air from flowing back, thus the problem of airflow backflow which easily occurs in a car washer known to inventors is solved.

BRIEF DESCRIPTION OF THE DRAWINGS

The accompanying drawings constituting a part of the disclosure are used for providing further understanding of the disclosure. Schematic embodiments of the disclosure and description thereof are used for illustrating the disclosure and not intended to form an improper limit to the disclosure. In the accompanying drawings:

FIG. 1 illustrates a section view of a steam generator according to an embodiment of a car washer of the disclosure.

The above accompanying drawings include the following reference numbers:

10, boiler; 11, combustion chamber; 20, windproof cover; 30, igniting cover; 40, air inlet grating; 41, airflow through hole; 50, air inlet baffle; 60, air duct retainer ring; 70, mounting cover.

DETAILED DESCRIPTION OF THE EMBODIMENTS

It is to be noted that the embodiments in the application and the characteristics in the embodiments may be combined under the condition of no conflicts. The disclosure is elaborated below with reference to the accompanying drawings and embodiments.

Figure 1:
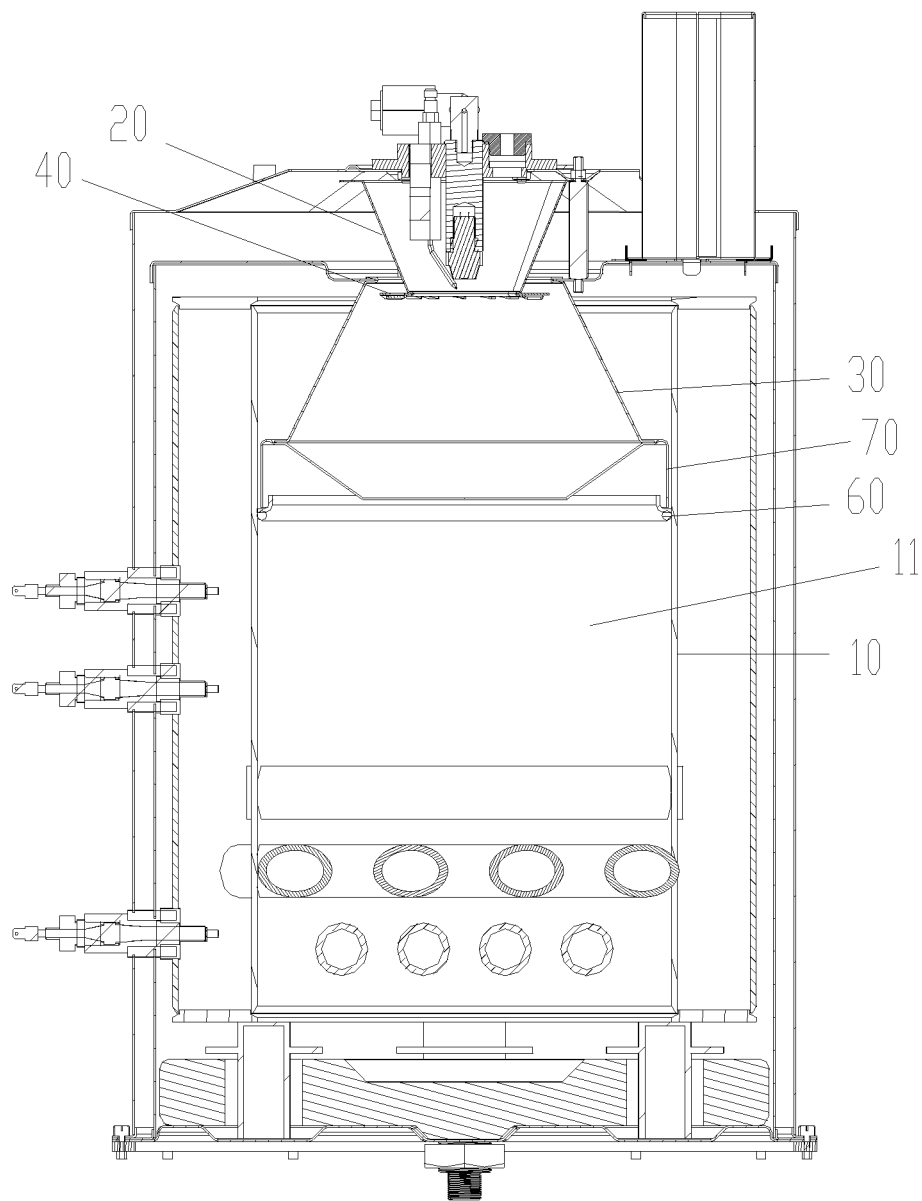
Figure 2:
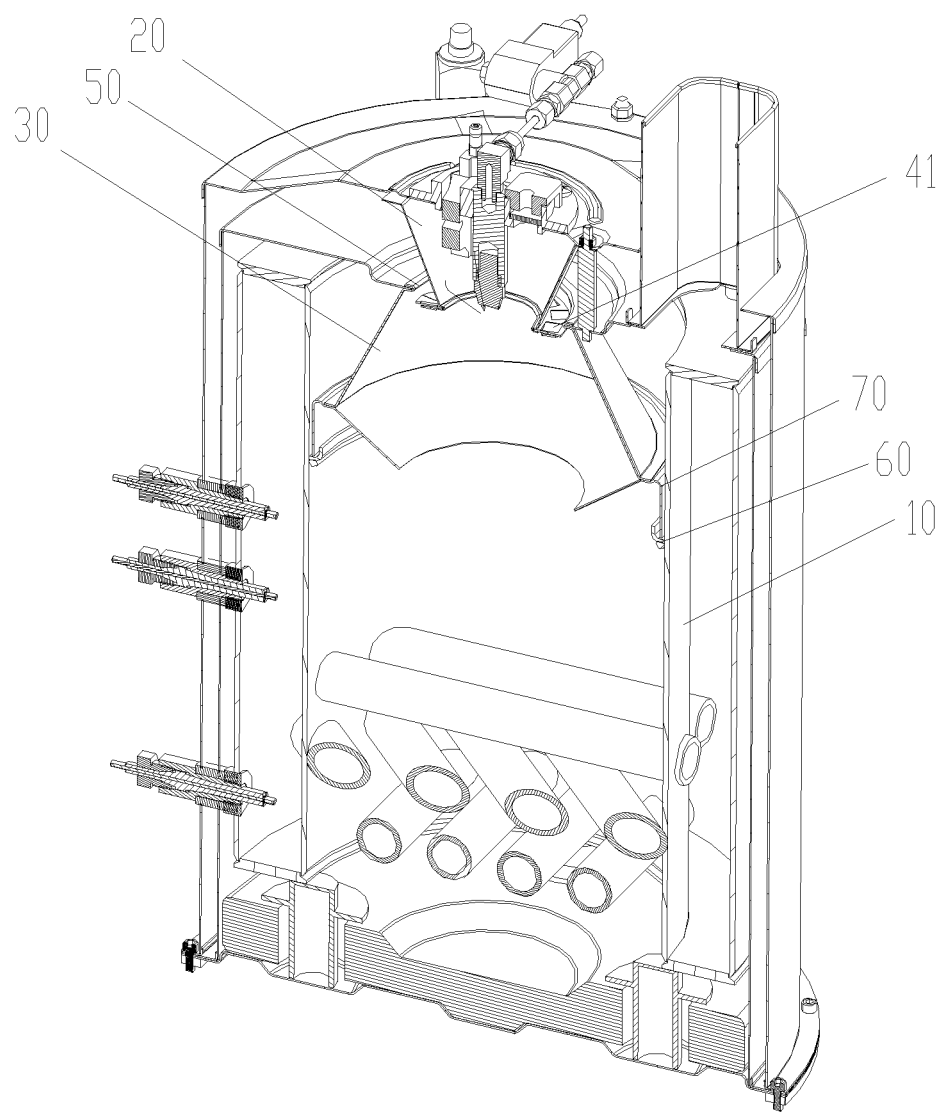
FIG. 2 illustrates a three-dimensional view of the steam generator in FIG. 1.
Figure 3:
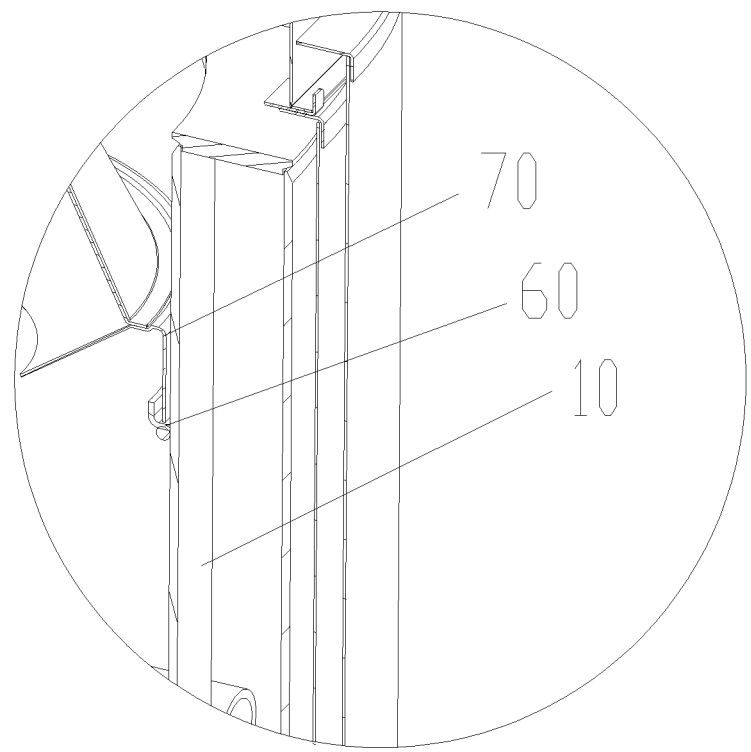
FIG. 3 illustrates a partial enlarged drawing of the steam generator in FIG. 2.
Figure 4:
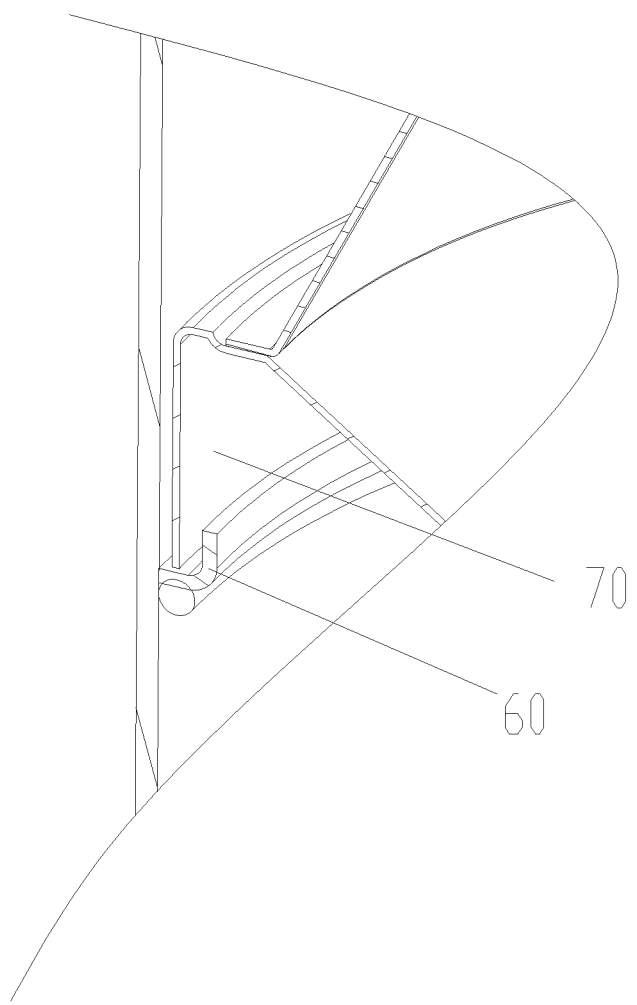
FIG. 4 illustrates another partial enlarged drawing of the steam generator in FIG. 2.

Some embodiments of the present disclosure provide a steam generator, which includes: a boiler 10 having a combustion chamber 11. With reference to FIG. 1 and FIG. 2, the steam generator further includes: a windproof cover 20, at least a part of an ignition device of the steam generator being located in the windproof cover 20; an igniting cover 30, at least a part of the igniting cover 30 being located in the combustion chamber 11 and an outlet of the windproof cover 20 being located in the igniting cover 30; and an air inlet grating 40, the air inlet grating 40 being provided around the windproof cover 20 and connected with the windproof cover 20, and the air inlet grating 40 being located on an inner side of an air inlet of the igniting cover 30, to prevent airflow in the igniting cover 30 from flowing out from the inlet of the igniting cover 30.

The steam generator in some embodiments of the disclosure includes the boiler 10, the windproof cover 20, the igniting cover 30 and the air inlet grating 40. Because at least a part of the ignition device of the steam generator is located in the windproof cover 20, and at least a part of the igniting cover 30 is located in the combustion chamber 11, the outlet of the windproof cover 20 is located in the igniting cover 30, the air inlet grating 40 is provided around the windproof cover 20 and is connected with the windproof cover 20, and the air inlet grating 40 is located at the inner side of the air inlet of the igniting cover 30. In this way, air in the igniting cover 30 is blocked by using the air inlet grating 40, so as to prevent the air in the igniting cover 30 from flowing out from the air inlet of the igniting cover 30, and then prevent the air from flowing back, thus the problem of airflow backflow which easily occurs in a car washer known to inventors is solved.

To make it convenient for the air to flow in the igniting cover 30, as shown in FIG. 2, an airflow through hole 41 is provided on the air inlet grating 40, so that the airflow entering from an inlet of the windproof cover 20 flows towards a middle part of the igniting cover 30 after passing through the airflow through hole 41.

In an exemplary embodiment, a spinning disk is provided at a bottom of the airflow through hole 41. By using the spinning disk, air flowing out from the airflow through hole 41 spirally enters the igniting cover 30 under an effect of the swirl vane.

To facilitate the import of airflow, an extension direction of the airflow through hole 41 is inclined to an axial direction of the boiler 10.

In an exemplary embodiment, as shown in FIG. 2, there are a plurality of airflow through holes 41, and the plurality of airflow through holes 41 are provided around the windproof cover 20. By arranging the plurality of airflow through holes 41, it is convenient for airflow to smoothly enter into the middle part of the igniting cover 30.

In an exemplary embodiment, the airflow through hole 41 is spiral. A spiral angle of the airflow through hole 4 is less than 180 degrees. In this way, the airflow spirally enters into the middle part of the igniting cover 30.

In some embodiments, the airflow through hole 41 is a quadrangular hole. At this point, a cross section, vertical to its extension direction, of the airflow through hole 41 is quadrangular.

To facilitate mounting of the air inlet grating 40, as shown in FIG. 1 and FIG. 2, the air inlet grating 40 is an annular plate. The air inlet grating 40 is connected to the outlet end of the windproof cover 20 and is provided around the outlet of the windproof cover 20.

In some embodiments, the steam generator includes an air inlet baffle 50 provided at the air inlet of the igniting cover 30. The air inlet baffle 50 is connected to a side wall of the igniting cover 30 and extends in a radial direction of the air inlet of the igniting cover 30. The air inlet grating 40 is located at a lower side of the air inlet baffle 50.

It is apparent that an effect of preventing airflow from flowing back is further enhanced by using the air inlet baffle 50.

In some embodiments, an annular gap is formed between an outside edge of the air inlet grating 40 and an inner wall of the igniting cover 30. In this way, airflow flows in the gap between the air inlet grating 40 and the inner wall of the igniting cover 30.

In some embodiments, the steam generator further includes an air duct retainer ring 60. An air inlet end of the air duct retainer ring 60 is provided around an air outlet of the igniting cover 30 and is connected with the igniting cover 30. An air outlet end of the air duct retainer ring 60 is connected with an inner wall of the combustion chamber 11, so that the airflow in the igniting cover 30 enters the combustion chamber 11 after passing through the air duct retainer ring 60.

To support the igniting cover 30, as shown in FIG. 2, the steam generator further includes: a mounting cover 70. The mounting cover 70 is located outside of the igniting cover 30 and the air duct retainer ring 60. A top of the mounting cover 70 is connected with the igniting cover 30, and a bottom of the mounting cover 70 is connected with the air duct retainer ring 60, so as to support the igniting cover 30 in the combustion chamber 11.

In an exemplary embodiment, the igniting cover 30 includes a first conical barrel and a second conical barrel. A large end of the first conical barrel is in abutting joint with a large end of the second conical barrel. A small end of the first conical barrel is the inlet of the igniting cover 30, and a small end of the second conical barrel is the outlet of the igniting cover 30.

Some embodiments of the disclosure also provide a car washer, which includes the abovementioned steam generator.

It can be seen from above description that the above embodiments of the disclosure achieve the following technical effects.

The steam generator in the disclosure includes the boiler 10, the windproof cover 20, the igniting cover 30 and the air inlet grating 40. Because at least a part of the ignition device of the steam generator is located in the windproof cover 20, and at least a part of the igniting cover 30 is located in the combustion chamber 11, the outlet of the windproof cover 20 is located in the igniting cover 30, the air inlet grating 40 is provided around the windproof cover 20 and is connected with the windproof cover 20, and the air inlet grating 40 is located at the inner side of the air inlet of the igniting cover 30. In this way, the air in the igniting cover 30 is blocked by using the air inlet grating 40, so as to prevent the air in the igniting cover 30 from flowing out from the air inlet of the igniting cover 30, and then prevent the air from flowing back, thus the problem of airflow backflow which easily occurs in a car washer known to inventors is solved.

The above are only some embodiments of the disclosure and not intended to limit the disclosure; for those skilled in the art, the disclosure has various modifications and changes. Any modifications, equivalent replacements, improvements and the like within the spirit and principle of the disclosure should fall within the protection scope of the claims of the disclosure.

What is claimed:

1. A steam generator, comprising: a boiler having a combustion chamber; wherein the steam generator further comprises:
    a windproof cover, at least a part of an ignition device of the steam generator being located in the windproof cover;
    an igniting cover, at least a part of the igniting cover being located in the combustion chamber, and an outlet of the windproof cover being located in the igniting cover; and
    an air inlet grating, the air inlet grating being provided around the windproof cover and connected with the windproof cover, and the air inlet grating being located on an inner side of an air inlet of the igniting cover, to prevent airflow in the igniting cover from flowing out from an inlet of the igniting cover;
    wherein an annular gap is formed between an outside edge of the air inlet grating and an inner wall of the igniting cover.

2. The steam generator as claimed in claim 1, wherein an airflow through hole is provided on the air inlet grating, so that airflow entering from an inlet of the windproof cover flows towards a middle part of the igniting cover after passing through the airflow through hole.

3. The steam generator as claimed in claim 2, wherein an extension direction of the airflow through hole is inclined to an axial direction of the boiler.

4. The steam generator as claimed in claim 2, wherein the steam generator further comprises a plurality of airflow through holes, and the plurality of airflow through holes are provided around the windproof cover.

5. The steam generator as claimed in claim 2, wherein the airflow through hole is a quadrangular hole.

6. The steam generator as claimed in claim 1, wherein the air inlet grating is an annular plate; the air inlet grating is connected to an outlet end of the windproof cover and is provided around the outlet of the windproof cover.

7. The steam generator as claimed in claim 1, wherein the steam generator further comprises an air inlet baffle provided at the air inlet of the igniting cover; wherein the air inlet baffle is connected with a side wall of the igniting cover and extends in a radial direction of the air inlet of the igniting cover; and the air inlet grating is located at a lower side of the air inlet baffle.

8. The steam generator as claimed in claim 1, further comprising:
    an air duct retainer ring; wherein an air inlet end of the air duct retainer ring is provided around an air outlet of the igniting cover and is connected with the igniting cover; an air outlet end of the air duct retainer ring is connected with an inner wall of the combustion chamber, so that the airflow in the igniting cover enters the combustion chamber after passing through the air duct retainer ring.

9. The steam generator as claimed in claim 8, further comprising:
    a mounting cover; wherein the mounting cover is located outside of the igniting cover and the air duct retainer ring; a top of the mounting cover is connected with the igniting cover, and a bottom of the mounting cover is connected with the air duct retainer ring, so as to support the igniting cover in the combustion chamber.

10. A car washer, comprising the steam generator as claimed in claim 1.

11. The car washer as claimed in claim 10, wherein an airflow through hole is provided on the air inlet grating, so that airflow entering from an inlet of the windproof cover flows towards a middle part of the igniting cover after passing through the airflow through hole.

12. The car washer as claimed in claim 11, wherein an extension direction of the airflow through hole is inclined to an axial direction of the boiler.

13. The car washer as claimed in claim 11, wherein the steam generator further comprises a plurality of airflow through holes, and the plurality of airflow through holes are arranged around the windproof cover.

14. The car washer as claimed in claim 11, wherein the airflow through hole is a quadrangular hole.

15. The car washer as claimed in claim 10, wherein the air inlet grating is an annular plate; the air inlet grating is connected to an outlet end of the windproof cover and is provided around the outlet of the windproof cover.

16. The car washer as claimed in claim 10, wherein the steam generator further comprises an air inlet baffle provided at the air inlet of the igniting cover; wherein the air inlet baffle is connected with a side wall of the igniting cover and extends in a radial direction of the air inlet of the igniting cover; and the air inlet grating is located at a lower side of the air inlet baffle.

17. The car washer as claimed in claim 10, wherein an annular gap is formed between an outside edge of the air inlet grating and an inner wall of the igniting cover.

18. The car washer as claimed in claim 10, wherein the steam generator further comprises:
    an air duct retainer ring; wherein an air inlet end of the air duct retainer ring is provided around an air outlet of the igniting cover and is connected with the igniting cover; an air outlet end of the air duct retainer ring is connected with an inner wall of the combustion chamber, so that the airflow in the igniting cover enters the combustion chamber after passing through the air duct retainer ring.

19. The car washer as claimed in claim 18, wherein the steam generator further comprises:
  a mounting cover; wherein the mounting cover is located outside of the igniting cover and the air duct retainer ring; a top of the mounting cover is connected with the igniting cover, and a bottom of the mounting cover is connected with the air duct retainer ring, so as to support the igniting cover in the combustion chamber.

\* \* \* \* \*